United States Patent
Musto et al.

(10) Patent No.: US 8,147,729 B2
(45) Date of Patent: Apr. 3, 2012

(54) TECHNIQUES FOR FORMING BURST CUTTING AREA MARK

(75) Inventors: James J. Musto, Pittston, PA (US); James Myrtle, Lehighton, PA (US)

(73) Assignee: Cinram International Inc., Scarborough (CA)

( * ) Notice: Subject to any disclaimer, the term of this patent is extended or adjusted under 35 U.S.C. 154(b) by 186 days.

(21) Appl. No.: 12/567,886

(22) Filed: Sep. 28, 2009

(65) Prior Publication Data

US 2010/0014408 A1   Jan. 21, 2010

Related U.S. Application Data

(62) Division of application No. 11/301,312, filed on Dec. 12, 2005.

(60) Provisional application No. 60/687,101, filed on Jun. 3, 2005.

(51) Int. Cl.
*B29D 11/00* (2006.01)

(52) U.S. Cl. ......... 264/2.5; 264/106; 264/220; 264/400; 264/482; 369/47.1; 369/47.12; 369/47.27

(58) Field of Classification Search ............... 428/64.4; 369/47.12, 52.1, 53.21, 53.22, 53.41, 47.1, 369/47.27; 264/2.5, 106, 220, 400, 482
See application file for complete search history.

(56) References Cited

U.S. PATENT DOCUMENTS

| | | | |
|---|---|---|---|
| 4,647,947 A | 3/1987 | Takeoka et al. | |
| 4,995,799 A | 2/1991 | Hayashi et al. | |
| 5,181,081 A | 1/1993 | Suhan | |
| 5,315,107 A | 5/1994 | Smith et al. | |
| 5,371,792 A | 12/1994 | Asai et al. | |
| 5,766,359 A | 6/1998 | Sichmann et al. | |
| 5,766,495 A | 6/1998 | Parette | |
| 5,792,538 A | 8/1998 | Yurescko-Suhan | |
| 5,863,328 A | 1/1999 | Sichmann et al. | |
| 5,900,098 A | 5/1999 | Mueller et al. | |
| 5,913,653 A | 6/1999 | Kempf | |
| 5,932,042 A | 8/1999 | Gensel et al. | |
| 5,932,051 A | 8/1999 | Mueller et al. | |
| 5,932,058 A | 8/1999 | Mueller | |
| 5,935,673 A | 8/1999 | Mueller | |
| 5,949,752 A | 9/1999 | Glynn et al. | |
| 5,958,651 A | 9/1999 | Van Hoof et al. | |
| 5,995,481 A | 11/1999 | Mecca | |

(Continued)

FOREIGN PATENT DOCUMENTS

EP    0802527 A1    10/1997

(Continued)

OTHER PUBLICATIONS

Sharpless, Graham, "CD and DVD Disc Manufacturing", Jul. 2003, acquired from http://www.multimediadirector.com/help/technology/downloads/tech_docs/replication.pdf.*

(Continued)

*Primary Examiner* — Gerard Higgins

(74) *Attorney, Agent, or Firm* — Cooper & Dunham LLP

(57) ABSTRACT

A BCA mark is applied prior to molding of optical recording media. A stamper including a BCA code is formed. The stamper including the BCA code is used in the molding of optical recording discs. This technique can be used in manufacturing of read-only type discs, recordable discs, rewritable discs, hybrid discs, discs readable from both disc sides, discs having multiple information layers, high-density discs, etc.

6 Claims, 2 Drawing Sheets

U.S. PATENT DOCUMENTS

| | | | |
|---|---|---|---|
| 5,997,976 | A | 12/1999 | Mueller et al. |
| 6,028,620 | A | 2/2000 | Yin |
| 6,052,465 | A | 4/2000 | Gotoh et al. |
| 6,081,785 | A | 6/2000 | Oshima et al. |
| 6,117,284 | A | 9/2000 | Mueller |
| 6,124,011 | A | 9/2000 | Kern |
| 6,160,787 | A | 12/2000 | Marquardt, Jr. et al. |
| 6,261,403 | B1 | 7/2001 | Gerigk et al. |
| 6,309,496 | B1 | 10/2001 | Van Hoof |
| 6,309,727 | B1 | 10/2001 | Mueller et al. |
| 6,361,845 | B1 | 3/2002 | Kern |
| 6,414,920 | B1 | 7/2002 | Lee |
| 6,440,248 | B1 | 8/2002 | Mueller |
| 6,453,420 | B1 | 9/2002 | Collart |
| 6,527,538 | B1 | 3/2003 | Pickutoski et al. |
| 6,546,193 | B1 | 4/2003 | Um et al. |
| 6,608,804 | B2 | 8/2003 | Shim |
| 6,641,886 | B1 | 11/2003 | Bakos et al. |
| 6,708,299 | B1 | 3/2004 | Xie |
| 6,726,973 | B2 | 4/2004 | Mueller |
| 6,728,181 | B2 | 4/2004 | Shimoda et al. |
| 6,814,825 | B2 | 11/2004 | Becker et al. |
| 6,885,629 | B2 | 4/2005 | Oshima et al. |
| 6,891,788 | B2 | 5/2005 | Yumiba et al. |
| 6,894,962 | B1 | 5/2005 | Nishiuchi et al. |
| 6,896,829 | B2 | 5/2005 | Kern et al. |
| 7,016,294 | B2 * | 3/2006 | Blankenbeckler et al. 369/275.3 |
| 7,325,287 | B2 | 2/2008 | Sweeney |
| 7,419,045 | B2 | 9/2008 | Kelsch |
| 7,535,806 | B2 | 5/2009 | Fumanti |
| 7,564,771 | B2 | 7/2009 | Sweeney |
| 2001/0033517 | A1 | 10/2001 | Ando et al. |
| 2002/0069389 | A1 * | 6/2002 | Sollish et al. ............... 714/758 |
| 2003/0031109 | A1 | 2/2003 | Lee et al. |
| 2003/0179688 | A1 * | 9/2003 | Blankenbeckler et al. 369/275.3 |
| 2004/0071060 | A1 | 4/2004 | Suh et al. |
| 2004/0076101 | A1 | 4/2004 | Suh et al. |
| 2004/0125722 | A1 | 7/2004 | Feehan et al. |
| 2004/0228254 | A1 | 11/2004 | Lee |
| 2005/0154905 | A1 | 7/2005 | Kojima et al. |
| 2006/0023598 | A1 | 2/2006 | Babinski et al. |
| 2006/0104190 | A1 | 5/2006 | Babinski |
| 2006/0114803 | A1 | 6/2006 | Ootera et al. |
| 2006/0114807 | A1 | 6/2006 | Ootera et al. |
| 2006/0165419 | A1 | 7/2006 | Musto |
| 2006/0181706 | A1 | 8/2006 | Sweeney |
| 2006/0222808 | A1 | 10/2006 | Pickutoski et al. |
| 2006/0270080 | A1 | 11/2006 | Rinaldi |
| 2006/0274617 | A1 | 12/2006 | Musto et al. |
| 2007/0090006 | A1 | 4/2007 | Kelsch |
| 2007/0098947 | A1 | 5/2007 | Mueller |

FOREIGN PATENT DOCUMENTS

| | | | |
|---|---|---|---|
| GB | 2176144 A | * | 12/1986 |
| WO | WO98/58368 | | 12/1998 |

OTHER PUBLICATIONS

ECMA, "120 mm DVD—Read-Only Disk" 3rd Edition, Apr. 2001, acquired from http://www.ecma-international.org/publications/files/ECMA-ST/Ecma-267.pdf.*

U.S. Appl. No. 13/100,513, filed May 4, 2011 of Shintaro Takehara et al.

U.S. Appl. No. 13/100,653, filed May 4, 2011 of Shintaro Takehara.

U.S. Appl. No. 11/705,682, filed Feb. 13, 2007 of Michael Parette.

U.S. Appl. No. 11/715,249, filed Mar. 6, 2007 of William R. Mueller et al.

U.S. Appl. No. 11/726,968, filed Mar. 22, 2007 of Lewis Gensel et al.

U.S. Appl. No. 11/936,625, filed Nov. 7, 2007 of Petrus Hubertus Van Hoof et al.

U.S. Appl. No. 11/938,572, filed Nov. 12, 2007 of Dominick A. Dallaverde et al.

U.S. Appl. No. 12/126,667, filed May 23, 2008 of Ed Pickutoski.

* cited by examiner

- LEAD OUT AREA
- DATA AREA
- LEAD IN AREA
- CLAMP AREA
- SPINDLE HOLE
- BURST CUTTING AREA Z
- AREA SHOWN IN FIG. 1B

BCA DATA

WIDTH OF LEAD-IN DATA AREA

TECHNIQUES FOR FORMING BURST CUTTING AREA MARK

CROSS-REFERENCE TO RELATED APPLICATION

This application is a divisional of U.S. application Ser. No. 11/301,312, filed Dec. 12, 2005, the entire contents of which are incorporated herein by reference. U.S. application Ser. No. 11/301,312 claims the benefit of U.S. Provisional Application No. 60/687,101, filed Jun. 3, 2005 and entitled "METHOD AND APPARATUS FOR APPLYING BURST CUTTING AREA MARK PRIOR TO REPLICATION".

TECHNICAL FIELD

This application relates to optical recording media. In particular, the application relates to application of a burst cutting area (BCA) mark prior to molding of the optical recording media.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is prerecorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs. Optical disc players for these optical discs use a red laser (with a wavelength range of 635 nm to 660 nm in the case of DVD and a wavelength of approximately 780 nm in the case of CD).

Optical discs using a blue laser (with a wavelength range of 400 nm to 420 nm) have also been introduced, such as HD DVD and BD (each of which includes read-only, recordable and rewritable formats). The popularity of optical storage media driven by advancements in computer, information communication and multimedia technologies has been accompanied also by demands for a higher density and a greater capacity of optical storage media. HD DVD and BD provide high density formats which attempt to meet such demands.

In addition, optical media having plural information layers readable from the same side (for example DVD-9) or readable from both sides (for example, DVD-10 and DVD-18), as well as hybrid optical media which include a combination of formats, are also available.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface in an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master. A metallized glass master is used in an electroforming process to form (typically, metal) stampers which are in turn used in injection molding of a plural of optical recording discs.

In the molding process, a stamper is used on one side of an injection molding cavity to emboss an information layer of pits and lands on a transparent polymer substrate formed by injection molding. The information bearing surface of the substrate is then covered with a reflective film (of metal or alloy) or the like. In the case of a CD, a plastic protective coating is applied over the film, and then art (for example, a picture, a design, text, etc.) is typically printed on the upper surface of the disc, to form an end product. In the case of DVDs, two half-thickness substrates are typically formed, metallization is applied to one (for example, DVD-5) or both (for example, DVD-10, DVD-9, DVD-18) half-thickness substrates, and the two half-thickness substrates are bonded by an adhesive (for example, hotmelt adhesive, ultraviolet light-cured adhesive, etc.). A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include a recording layer, and in addition a reflective layer (of metal or alloy) and a protective layer, and may include other layers. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to irreversibly form a pattern of marks or pits into the recording layer.

Each recording side of a rewritable disc also uses multiple layers beginning with a polycarbonate plastic substrate containing a shallow spiral groove extending from the inside to the outside diameter of the disc. A DVD-RW disc may additionally include pits and lands and a DVD-PAM disc also inside or alongside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer, and art may be applied to at least one surface. During recording of the rewritable optical medium, the laser selectively heats and allows cooling of tiny areas of the recording track to change the phase of each heated area from more crystalline into less crystalline (also known as "amorphous") phase, in order to create marks that can be called "pits". During erase, the laser (in a process called "annealing") changes the amorphous areas back into more crystalline areas.

HD-DVD format discs can be produced using a process similar to the process for forming a DVD disc, except that the minimum pit length is shorter and therefore the laser beam recorder used in the mastering process must be adapted to form the shorter pits.

BD format discs are typically manufactured by injection molding a 1.1 mm substrate with pits and sputtering a reflective layer over the pits to form an information layer, and applying a 0.10 mm transparent cover layer over the information layer.

Various types of hybrid optical media are available. For example, one type of hybrid media has data pit patterns prerecorded on a surface of a substrate and has in addition a recording layer allowing a user to record data to the recording layer. Further, optical recording media having multiple recording layers are now also available. In addition, in another hybrid optical recording disc a read-only area and a recordable area are present on one side of the hybrid optical disc, with a wobble groove in the read-only area modulated by depressions in the substrate and extending into the substrate in the recordable area. Each of the hybrid optical media has one or more reflective films (of metal or alloy) or the like.

The high capacity of optical recording media, coupled with recent enhancements to personal computers and the advent of recordable optical media technology, renders optical media popular for illicit use. For example, unauthorized copying of proprietary and/or copyrighted, recorded content from optical media to optical media on a large scale (also referred to as "piracy") is a growing concern. The piracy typically entails using software on a computer system having an optical medium drive to copy content from a recorded optical medium onto recordable media such as CD-R or CD-RW (or DVD-R, DVD-RW or DVD+RW) discs.

Many copy protection techniques and devices have been proposed to limit copying of content on optical media. Several of the proposed copy protection techniques are discussed in commonly-owned U.S. application Ser. No. 10/903,099, filed Jul. 30, 2004 and entitled METHOD AND APPARATUS FOR PROTECTING AGAINST COPYING OF CONTENT RECORDED ON OPTICAL RECORDING MEDIA, the entire contents of which are incorporated by reference herein.

Some optical recording media have a burst cutting area (BCA) which is specified by the standards or specifications which govern those types of optical recording media. For example, the specifications for DIVX, DVD and HD-DVD, respectively, include provisions for a burst cutting area, intended for copy protection use. In the DIVX format, the burst cutting area is used on each disc for a disc identifier which uniquely identifies the disc.

The DVD specification which specifies the format of data on DVDs provides for an optional Burst Cutting Area inside of the lead-in area of a DVD, between an inner circumference of 22.3 mm+0/−0.4 mm and to an outer circumference of 23.5 mm+/−0.05 mm from the center of the center hole of a disk.

The Burst Cutting Area is intended to be a location on a DVD onto which a mark, such as a copy protection mark or code, or a bar code as a unique serial code for the DVD, can be written by a power laser (Annex K). It has been proposed that the serial code can be used for tracking DVDs and thereby also serve an objective of copy prevention. The DVD specification does not preclude the possibility of repeating the same mark on multiple discs of the same title.

A schematic representation of assorted areas of a DVD is illustrated exemplarily in FIG. 1A. The disk has a diameter of 120 millimeters with a center spindle hole of 15 millimeters. Adjacent to the spindle hole is a disk clamping area, depicted with dots, having minimum and maximum diameters of 22 and 33 millimeters respectively. A guard band is provided between the clamping area and a lead-in data area, depicted with horizontal lines in FIG. 1A, (multiple dots in FIG. 1B) and occupying an area between diameters of 45.2 and 48 millimeters. The data or "program" area is shown with vertical stripes and is located between diameters of 48 and 116 millimeters, with a lead-out width of at least 1 millimeter. To facilitate the individualization of disks following mass production an area is provided where disk specific data, for example serial number or identification data can be added. This optional marking area is known as the burst cutting area or BCA, and is located between diameters of 44.6 to 47 millimeters (shown in FIG. 1B between radii R1 and R3, respectively). All dimensions stated above are nominal, and omit allowable tolerances. Thus BCA data records are written within the lead-in data area of the disk.

Content Protection for Recordable Media (CPRM) is an option found in some DVD recorders that write DVD-RW and DVD-RAM discs using the DVD Video Recording format (DVD-VR). Such an option allows material specifically flagged "copy once" to be written to a single disc but prevents that disc from then being further duplicated. This restriction is accomplished by binding the content to the particular disc through encryption employing, amongst other information, a code (media identifier) unique to each writable disc compliant with the CPRM system. The code is inserted into the Burst Cutting Area (or Narrow Burst Cutting Area or NBCA in the case of a DVD-RW) of the disc, to keep the disc from being further duplicated by a DVD recorder.

U.S. Pat. Nos. 6,608,804, 6,641,886, 6,885,629, 6,891,788 and 6,894,962 discuss assorted uses of a burst cutting area and types of information which can be written in the burst cutting area. Some conventional techniques for writing and processing of data in a burst cutting area are discussed in U.S. Pat. Nos. 6,052,465, 6,081,785, 6,414,920, 6,453,420, 6,546,193, 6,708,299, 6,728,181, and in International Publication No. WO98/58368. The entire contents of each of U.S. Pat. Nos. 6,052,465, 6,081,785, 6,414,920, 6,453,420, 6,546,193, 6,608,804, 6,641,886, 6,708,299, 6,728,181, 6,885,629, 6,891,788 and 6,894,962, and International Publication No. WO98/58368 are incorporated herein in order to more fully illustrate the state of the art as of the date of the subject matter described herein.

Conventionally, marks have been applied to a burst cutting area after the injection molding stage by cutting a mark with a low contrast relative to the remainder of the disc, onto the reflective layer of the disc. This approach requires either an offline process to apply the mark to the burst cutting area or an inline BCA writer. Marks are typically placed in the burst cutting area on DIVX discs, DVD discs and Gamecube discs using these techniques. However, each process adds cost and time to the process and the large expense of BCA marking equipment (approximately $500 k per BCA writer).

SUMMARY

This disclosure discusses techniques for applying a BCA mark prior to molding of the disc. In instances in which serialization of a BCA code is not needed, the same BCA data can be placed on each of plural discs in a molding run, by applying the BCA mark on a metallized mastering substrate (made of, for example, glass, silicon, etc.), a father, a mother or a stamper. The optical disc formed using the techniques of this disclosure comprises an information carrying area, a burst cutting area, and an embossed BCA mark formed at the burst cutting area.

The techniques of this application can be used in manufacturing of read-only type discs, recordable discs, rewritable discs, hybrid discs, discs readable from both disc sides, discs having multiple information layers, high-density discs, etc.

BRIEF DESCRIPTION OF THE DRAWINGS

The features of the present application can be more readily understood from the following detailed description with reference to the accompanying drawings wherein.

DETAILED DESCRIPTION

The following discussion of exemplary embodiments of the techniques of this application is set forth to aid in an understanding of the subject matter of this disclosure, but is not intended, and should not be construed, to limit in any way the scope of this disclosure. Therefore, while specific terminology is employed for the sake of clarity in describing some exemplary embodiments, the present disclosure is not intended to be limited to the specific terminology so selected, and it is to be understood that each specific element includes all technical equivalents thereof.

The techniques of this disclosure include adding data to a burst cutting area (BCA) prior to molding which can be readable by the optical disc drive, such as for authentication purposes. This application provides tools (in the form of methodologies, apparatuses, and systems) for applying a burst cutting area (BCA) mark or code prior to molding of the optical recording media, such as onto a mastering substrate, father, mother or stamper. The techniques of this disclosure avoids the use of special-purpose BCA writer hardware (which cost approximately $500 k) when serialization is not needed.

The terms "BCA mark" and "BCA code" are used herein interchangeably to denote any mark, code, cut or surface reflectance variation serving for copy protection, disc identification or other information to be inserted in a burst cutting area (for example, BCA, NBCA, etc.) of a disc. It is known in the art (and it has been proposed) that the burst cutting area can be used for assorted purposes. The techniques of this application can be used to apply BCA marks or codes for any of such purposes that does not require serialization or varying other information in the BCA mark or code from disc to disc in a molding run.

Figure 1A:
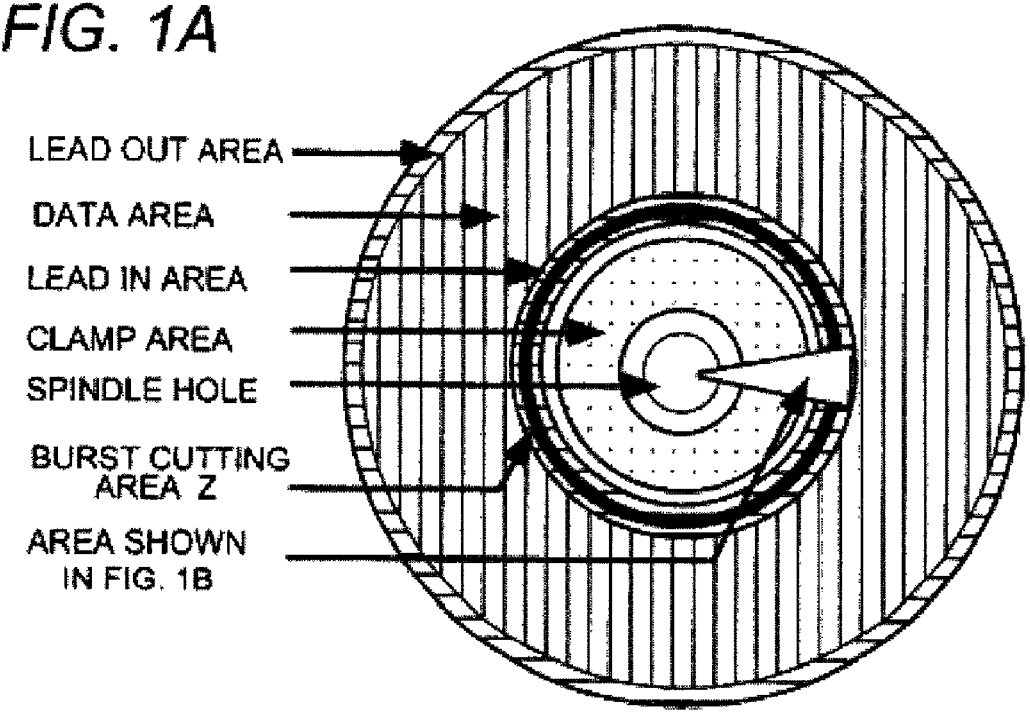
FIG. 1A shows a schematic representation of an exemplary optical disc, such as a DVD.
Figure 1B:
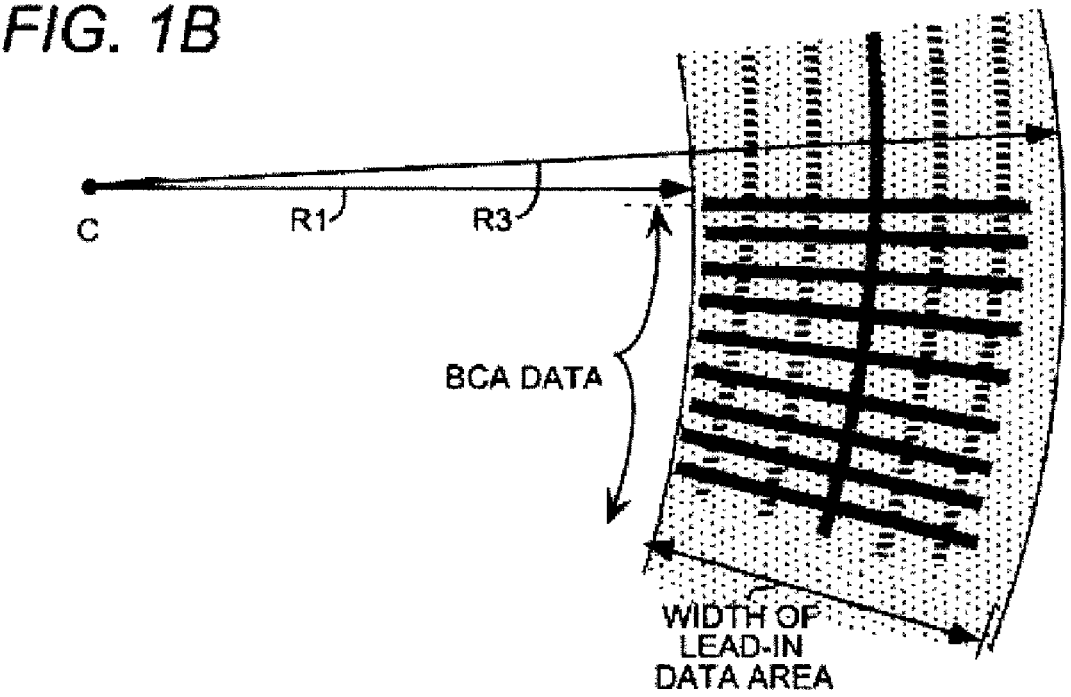
FIG. 1B shows an exploded view of a cutout area in FIG. 1A.
Figures 2, 3:
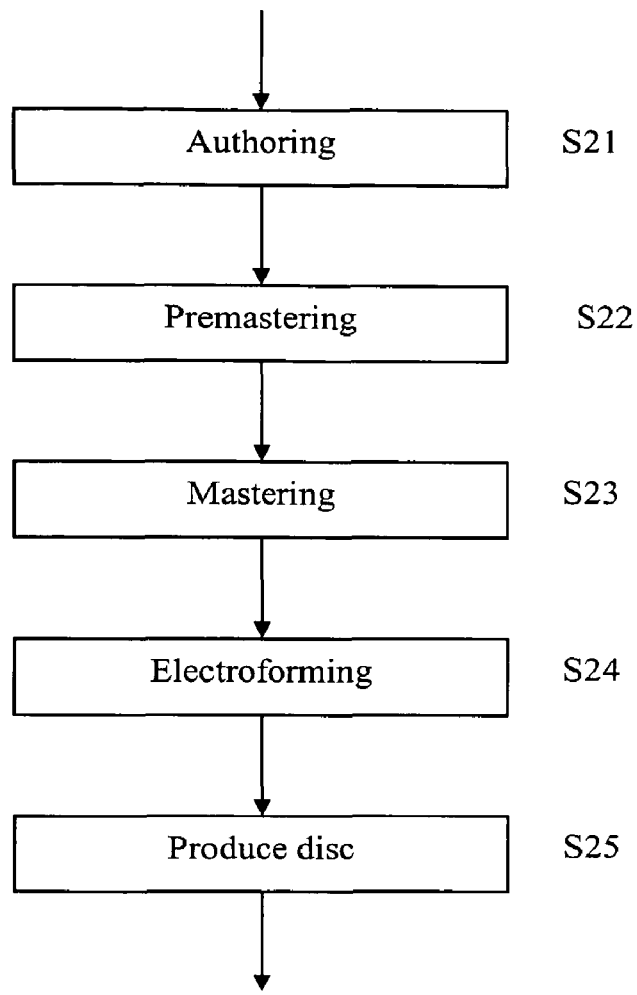
FIG. 2 shows a flow chart of a creation process for a read-only type optical recording disc, according to an exemplary embodiment.
FIG. 3 shows a flow chart of a method for applying a BCA mark prior to molding of optical recording media, according to an exemplary embodiment of this disclosure.

An overview of optical recording disc creation, according to an exemplary embodiment, will be provided below with reference to FIG. 2.

Authoring (step S21) and pre-mastering (step S22) activities are performed in order to preprocess content into a suitable form for generating an appropriate disc image for replication of read-only type optical discs. Preparation for applying a BCA mark may include applying the BCA mark to the disc image in pre-mastering.

It should be understood, however, that the techniques of this application are not limited to creation of read-only type optical discs and can be applied to any optical recording disc which includes a burst cutting area, by applying a BCA mark or code prior to molding of the optical recording media.

Mastering (step S23) is a process, following pre-mastering in the disc creation process, for creating a model, on a mastering substrate, of the final disc which is used for generating a stamper used in a mold for molding the optical media. Mastering includes reading a disc image (information) from a source media, and then formatting, encoding, and processing the information into a modulated data signal. The modulated data signal is used to control a laser beam recorder to form pits and other marks, such as the BCA mark, in a photoresist or a dye-polymer layer on an optical grade mastering substrate (of, for example, glass, silicon, etc.). As mentioned above, the BCA mark may be incorporated in the disc image and therefore the modulated data signal would cause the laser beam recorder to form the BCA mark in the mastering substrate. Alternatively, the BCA mark may be formed by the laser beam recorder in an additional pass over the mastering substrate, such as when the disc image does not include the BCA mark, or by another device for forming BCA marks.

In any event, the mastering substrate is covered with a metal layer (for example, silver), and the metallized mastering substrate is used in an electroforming process to form (typically, metal) stampers which are in turn used in the molding of a plural of optical recording discs.

In the electroforming process (step S24), a father is formed, for example, by placing the metallized mastering substrate into a vessel containing a nickel sulphamate solution for a predetermined period of time (for example, two hours) during which a layer of nickel is grown onto the metallized surface of the mastering substrate, and at the end of which a sheet of nickel, constituting the father, is separated from the surface of the metallized mastering substrate. The father is a reverse image of the data and can be used to stamp discs. However, a stamping device which becomes an integral part of a mold is subjected to many stresses in the molding process. Accordingly, the father is typically not used to stamp discs since if it is damaged the entire process of creating a father would have to be repeated. Therefore, the father is instead used to form a mother, by applying an electroforming process to the father to grow thereon a sheet of nickel constituting the mother. The mother is separated from the father and in turn used in an electroforming process to grow another sheet of nickel which constitutes the stamper. The stamper, like the father, is a reverse image of the data and therefore can be used in the injection molding of discs. Several stampers can be grown from a mother.

A method for applying a BCA mark prior to molding of optical recording media, according to an exemplary embodiment (FIG. 3), includes forming a stamper including a BCA code (step S31), and using the stamper including the BCA code in the molding of optical recording discs (step S33).

The BCA mark can be applied at the time of mastering by creating a solid graphic mark that meets all of the physical specifications of BCA marking parameters such as depth, width, length and spacing between marks. The depth, width, length and spacing may be adapted to accommodate contrast and shrinkage. The BCA mark can be mastered onto a mastering substrate and thereby allows all of the molded discs to contain the same BCA mark.

The laser beam recorder can be controlled appropriately to form such a mark during mastering. As one example, the mark may be formed by applying the laser beam recorder in a non-continuous spiral mode that is timed with a pulse per revolution signal according to the desired BCA mark.

Alternatively, the BCA mark can be applied during the electroforming process to a father, mother or stamper, by using, for example, a YAG laser, and thereby avoid the need for BCA writer hardware for applying a BCA mark after the molding process.

After stampers are formed, a process (step S25) generally including the steps of molding, metallizing, printing and testing is performed.

Methodologies and apparatuses which can be used in a manufacturing process are discussed in U.S. Pat. Nos. 4,995,799, 5,766,359, 5,766,495, 5,792,538, 5,863,328, 5,900,098, 5,913,653, 5,932,042, 5,932,051, 5,932,058, 5,935,673, 5,949,752, 5,958,651, 5,995,481, 5,997,976, 6,117,284, 6,124,011, 6,160,787, 6,261,403, 6,309,496, 6,309,727, 6,361,845, 6,440,248, 6,527,538 and 6,814,825, the entire contents of each of which are incorporated by reference herein.

The techniques of this disclosure can be applied to any of a broad range of optical discs, such as DVDs, high-density discs (for example, HD DVD and BD), etc., including any of the formats.

For example, the techniques of this disclosure may be applied to form stampers for use in molding optical discs that comply with the requirements of the BD read-only format. The stampers are used to form an information layer which includes a series of pits embossed in a plane of land, all of which being then covered by a reflective layer. Such an information layer typically comprises an information track having pits with a minimum length along the track in a range of 138 nm to 160 nm, and comprises information marks configured for reading using a laser with a wavelength in a range of 400 nm to 420 nm and a numerical aperture of 0.85. The burst cutting area of such a disc is in an annular region of the disc at an inner radius of 21.0(+0.3/−0)mm and outer radius of 22.2(+0/−0.2)mm.

The techniques of this disclosure also may be applied to form stampers for use in molding optical discs that comply with the requirements of the HD-DVD read-only format. The information layer of such discs typically comprises an information track comprising pits having a minimum length of approximately 204 nm and comprises information marks configured for reading using a laser with a wavelength in a range of 400 nm to 420 nm and a numerical aperture of 0.65. The burst cutting area of such a disc is in an annular region of the disc at an inner radius of 22.3(+0/−0.4)mm and an outer radius of 23.15(+0.05/−0.05)mm.

Similarly, the techniques of this disclosure also may be applied to form stampers for use in molding optical discs that comply with the requirements of the DVD read-only format. The burst cutting area of such a disc is in an annular region of the disc at an inner radius of 22.3(+0/−0.4)mm and an outer radius of 23.50(+0.05/−0.05)mm.

In each instance, a BCA mark is formed in the stamper, and each disc molded using the stamper would also bear the BCA mark. The optical disc formed using the techniques of this disclosure comprises an information carrying area, a burst cutting area, and an embossed BCA mark formed at the burst cutting area.

The above specific embodiments are illustrative, and many variations can be introduced on these embodiments without departing from the spirit or scope of the disclosure. For example, elements and/or features of different illustrative embodiments may be combined with each other and/or substituted for each other within the scope of this disclosure.

What is claimed is:

1. A method for applying data to a burst cutting area (BCA) prior to molding of optical recording media, said method comprising:
    forming a stamper including BCA data thereon; and
    using the stamper including the BCA data in the molding of optical recording discs to form optical recording discs including a BCA mark thereon,
    wherein the BCA data is applied by a laser to one of a father or a mother,
    where the stamper is formed using the mother, and the mother is formed using the father and the father is formed using a mastering substrate.

2. The method of claim 1, wherein the BCA data is applied to the father, and the father including the BCA data is used in a process for forming the stamper.

3. The method of claim 1, wherein the BCA data is applied to the mother, and the mother including the BCA data is used in a process for forming the stamper.

4. The method of claim 1, further comprising the step of covering an information layer and the BCA mark of the optical recording discs with a reflective layer.

5. The method of claim 1, wherein the BCA mark applied to the stamper has physical parameters that accommodate contrast and shrinkage in the molded optical recording discs.

6. The method of claim 1, wherein the BCA data is applied by the laser in a non-continuous spiral mode that is timed with a pulse per revolution signal according to the BCA data.

* * * * *